Aug. 9, 1938.  G. E. FALLESEN ET AL  2,126,318
PRINT-OUT EMULSION
Filed Feb. 9, 1937
*Print-out Emulsion formed of Silver-Hydroxide-Organic Alkali Complex and a Halide, containing Semicarbazide Hydrochloride*
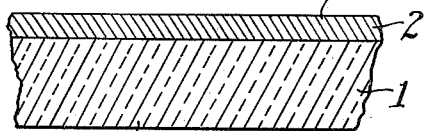
Glass or cellulose ester support
George E. Fallesen
Cyril J. Staud
INVENTORS
BY
ATTORNEYS Patented Aug. 9, 1938

2,126,318

UNITED STATES PATENT OFFICE 2,126,318

PRINT-OUT EMULSION

George E. Fallesen and Cyril J. Staud, Rochester, N. Y., assignors to Eastman Kodak Company, Rochester, N. Y., a corporation of New Jersey Application February 9, 1937, Serial No. 124,865

8 Claims. (Cl. 95—7)

This invention relates to photographic material and more particularly to a print-out photographic emulsion having increased sensitivity to light.

Of the two types of commonly used photographic emulsions, known respectively as developing emulsions and print-out emulsions, the present invention relates primarily to the latter type. In these emulsions, a visible image is produced directly by the action of light, as compared with developing emulsions in which the image is rendered visible, after exposure, by treatment with a developing solution.

In our prior patent, No. 2,030,860, granted February 18, 1936, we disclosed a method for making a highly sensitive print-out emulsion. According to the invention disclosed therein, the print-out emulsion was produced by precipitating silver hydroxide with ammonia from a silver nitrate solution, dissolving the precipitate in an organic base, mixing this solution with a carrier such as gelatin and adding to it a halide such as potassium bromide. To the emulsion thus formed, there could be added a further quantity of silver nitrate or an additional amount of sodium nitrite, which results in an increased sensitivity.

It was found that when the emulsions made according to our prior patent were coated on glass or cellulose ester supports, the sodium nitrite exhibited a tendency to crystallize out. A further disadvantage of the sodium nitrite was that it tended to weaken the gelatin in the emulsion, thereby increasing the difficulties of coating on glass or cellulose ester supports. Although a coating of the emulsion with excess silver nitrate could be made on glass without crystallization ensuing, there was found to be an appreciable loss of print-out sensitivity without the sodium nitrite.

It is, therefore, an object of the present invention to provide a highly sensitive print-out emulsion which may be coated on a cellulose ester or glass support without objectionable crystallization of the emulsion constituents. A further object is to provide a print-out emulsion which may be easily coated on glass or cellulose ester supports.

These objects are accomplished by substituting semi-carbazide hydrochloride or other organic or inorganic acid salts of semi-carbazide for sodium nitrite and excess silver nitrate in the emulsion of our prior Patent No. 2,030,860.

In the accompanying drawing, the single figure is a sectional view of a film or plate formed according to our invention.

The following example illustrates one method of forming a highly sensitive print-out emulsion suitable for coating on glass or cellulose ester supports according to our invention:

Three solutions are formed as follows:

Solution A is formed by dissolving 25 grams of silver nitrate in 75 cc. of water and adding to this solution 5 cc. of ammonium hydroxide (28% concentration). A precipitate of silver hydroxide is formed and this is dissolved in 35 cc. of pyridine.

Solution B is formed by dissolving 10 grams of potassium bromide, 10 grams of sodium chloride and 0.025 gram of potassium iodide in 63 cc. of water.

Solution C consists of 40 grams of gelatin in 700 cc. of water.

An emulsion is made from these solutions as follows: one half of solution C is added to solution A and the other half of C is added to B. The mixtures AC and BC are then poured together alternately at 40° C. The temperature of this mixture is gradually brought up to 75° C. in 15 minutes and then chilled to 35° C. as rapidly as possible. The emulsion is set and shredded and washed for one hour. Twenty grams of gelatin are then added and dissolved at about 40° C. to 60° C. in 10 minutes. A solution of 1 gram of semi-carbazide hydrochloride in 40 cc. of water is added at this point and the emulsion then chilled to coating temperature as rapidly as possible.

In addition to semi-carbazide hydrochloride, other organic or inorganic acid salts of semi-carbazide, such as semi-carbazide sulphate, may be added to the emulsion. The addition of excess silver nitrate in combination with aforesaid salts appears to be detrimental, causing a brown fog and large specks of silver.

In addition to pyridine, other organic bases or alkalies may be used to dissolve the silver hydroxide precipitate. These include the amines, such as methylamine, benzylamine, napthylamine, and triethanolamine; heterocyclic nitrogen bases such as pyridine, piperidine, quinoline, (in methyl alcohol), acridine (in methyl alcohol), and α-picoline; amides such as acetamide. As halides, we have found that both potassium bromide and potassium chloride or mixtures of these two, either with or without potassium iodide are satisfactory.

As disclosed in our prior patent, the gelatin used to disperse the sensitive salt, may be replaced by cellulose mixed esters such as cellulose acetate phthalate. In this case, the halide used to form the sensitive salt may be replaced by bromacetic acid or other halogenated aliphatic acids or with other bromide or halide substituted compounds, such as bromo-esters, in the manner disclosed in our prior patent.

In the single figure of the accompanying drawing, we have shown in sectional view a photographic element formed according to our invention. As shown therein, 1 is the support of glass or a cellulose ester and 2 is the sensitive emulsion formed according to our process.

The emulsions produced by the method described above have about the same sensitivity as the emulsions obtained by the process of our prior Patent No. 2,030,860. They may be coated on glass or cellulose ester supports without objectionable crystallization of the emulsion constituents. On exposure to light, the emulsion prints out with pleasing blue and cream tones at a high rate of speed. If desired, the emulsion may also be developed.

It is to be understood that the examples included in the above specification are illustrative only and that our invention comprises all modifications and equivalents coming within the scope of the appended claims.

We claim:

1. A process of producing a light-sensitive emulsion which comprises precipitating silver hydroxide in an aqueous solution, dissolving the precipitate in an organic alkali, mixing the solution with an inert carrier and adding an alkali metal halide to the mixture to form an emulsion, and then adding to the emulsion approximately 1.6%, based on the weight of inert carrier, of a semi-carbazide acid salt.

2. A process of producing a light-sensitive emulsion which comprises precipitating silver hydroxide in an aqueous solution, dissolving the precipitate in an organic alkali, mixing the solution with an inert carrier therefor and adding an alkali metal halide to the mixture to form an emulsion, and then adding to the emulsion approximately 1.6%, based on the weight of inert carrier, of semi-carbazide hydrochloride.

3. A process of producing a light-sensitive emulsion which comprises precipitating silver hydroxide in an aqueous solution, dissolving the precipitate in an organic alkali, mixing the solution with gelatin and adding an alkali metal halide to the mixture to form an emulsion, and then adding to the emulsion approximately 1.6%, based on the weight of gelatin, of a semi-carbazide inorganic acid salt.

4. A process of producing a light-sensitive emulsion which comprises precipitating silver hydroxide in an aqueous solution, dissolving the precipitate in an organic alkali, mixing the solution with gelatin and adding an alkali metal halide to the mixture to form an emulsion, and then adding to the emulsion approximately 1.6%, based on the weight of gelatin, of semi-carbazide hydrochloride.

5. A process of producing a light-sensitive emulsion which comprises precipitating silver hydroxide in an aqueous solution, dissolving the precipitate in a heterocyclic nitrogen base, mixing the solution with gelatin and adding an alkali metal halide to the mixture to form an emulsion, and then adding to the emulsion approximately 1.6%, based on the weight of gelatin, of semi-carbazide hydrochloride.

6. A light-sensitive surface comprising the product resulting from the reaction of a complex solution of silver hydroxide in an organic alkali, on an alkali metal halide in the presence of a carrier, and containing approximately 1.6%, based on the weight of carrier, of semi-carbazide hydrochloride.

7. A photographic element comprising a cellulose ester support coated with gelatin containing the product resulting from the reaction of a complex solution of silver hydroxide in an organic alkali, on an alkali metal halide, and containing approximately 1.6%, based on the weight of gelatin, of semi-carbazide hydrochloride.

8. A photographic element comprising a glass support coated with gelatin containing the product resulting from the reaction of a complex solution of silver hydroxide in an organic alkali, on an alkali metal halide, and containing approximately 1.6%, based on the weight of gelatin, of semi-carbazide hydrochloride.

GEORGE E. FALLESEN.
CYRIL J. STAUD.